(No Model.) 2 Sheets—Sheet 1.

A. H. BARTON & P. N. OLDREY.
OBTAINING MOTIVE POWER FROM RUNNING WATER.

No. 583,355. Patented May 25, 1897.

Witnesses
F. C. Barry
E. C. Duffy

Inventors
A. H. Barton and
P. N. Oldrey
per O. E. Duff
Attorney

THE NORRIS PETERS CO., PHOTO-LITHO., WASHINGTON, D. C.

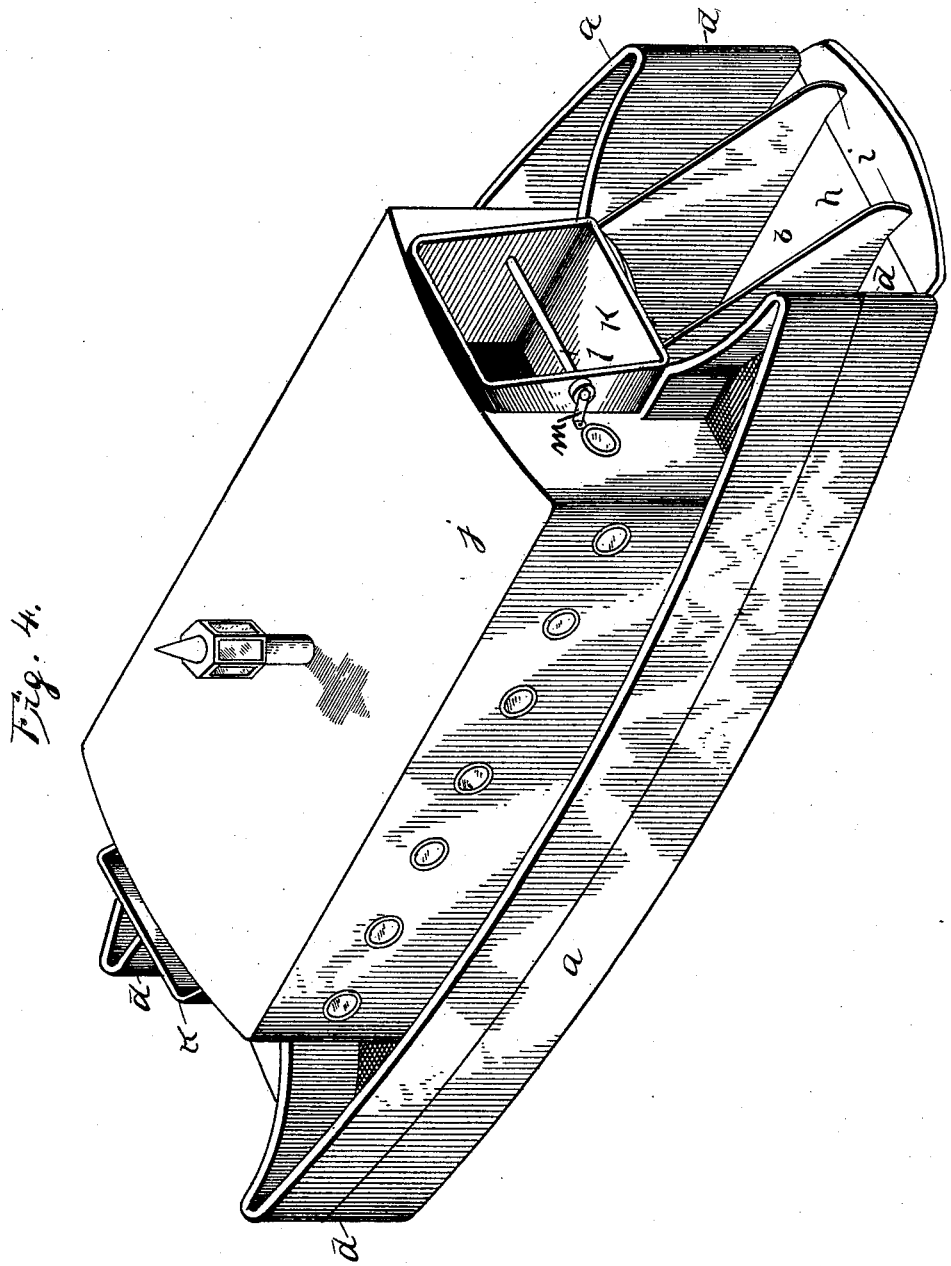

United States Patent Office.

ALFRED HENRY BARTON AND PERCY NUGENT OLDREY, OF SOUTHAMPTON, ENGLAND, ASSIGNORS TO SAID BARTON AND WILLIAM BEAVIS, OF SAME PLACE.

OBTAINING MOTIVE POWER FROM RUNNING WATER.

SPECIFICATION forming part of Letters Patent No. 583,355, dated May 25, 1897.

Application filed February 9, 1897. Serial No. 622,627. (No model.) Patented in England February 7, 1895, No. 2,748.

*To all whom it may concern:*

Be it known that we, ALFRED HENRY BARTON and PERCY NUGENT OLDREY, of Southampton, England, have invented certain new and useful Improvements in Obtaining Motive Power from Running Water, (for which we have obtained a patent in Great Britain, No. 2,748, dated February 7, 1895;) and we do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to apparatus for utilizing the motion of water and of the air to generate power, and has for its object to furnish an apparatus which will be automatically operated by the flow of the tide or the water of running streams and in which its operation may be facilitated by the action of the wind under certain circumstances.

With this object in view the invention consists in certain new and useful improvements in the construction, arrangement, and combination of the parts of such apparatus, as will now be fully described, and afterward specifically pointed out in the claims.

Figure 1:
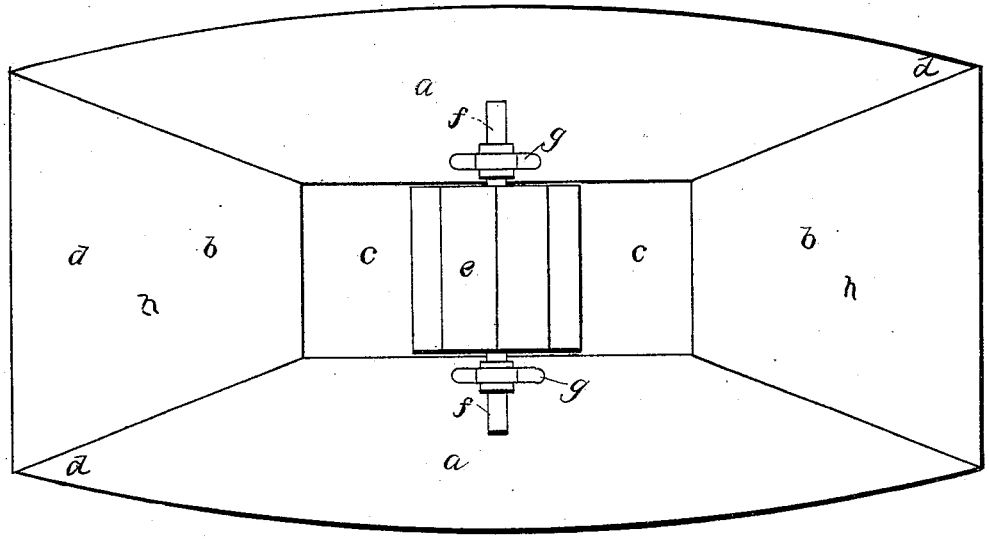
Figure 2:
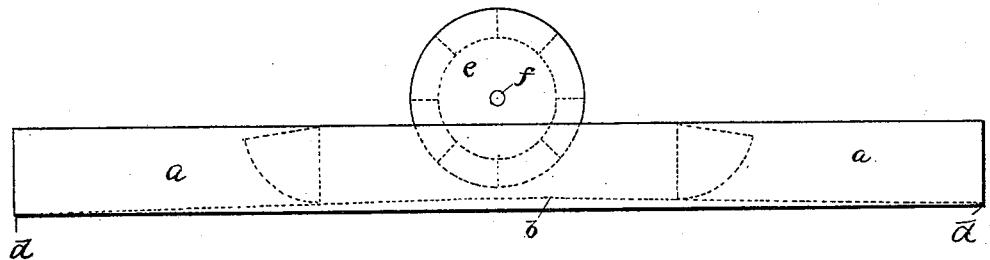
Figure 3:
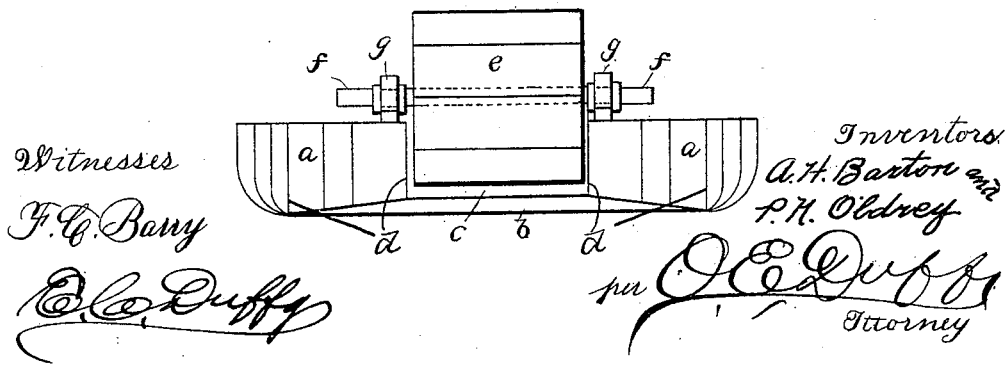

Referring to the accompanying drawings, Figure 1 is a plan view of the hulls and supports of a structure embodying our invention, the upper parts, consisting of the wind-utilizing devices, being removed. Fig. 2 is a view in side elevation of the same parts shown in Fig. 1. Fig. 3 is an end elevation of the same. Fig. 4 is a view in perspective of a device of this class complete and ready for utilization of water and wind.

Like letters of reference mark the same parts in all the figures of the drawings.

Referring to the drawings by letters, $a$ $a$ are two hulls, arranged in "catamaran" form, supported by and secured to a bottom plate or base $b$, leaving an open passage $c$ between said hulls, the said passage converging or narrowing, as at $d$, from the ends to the central part thereof, so that the water flowing through will be concentrated at said central part and greater power obtained than would be with a straight passage. The water-wheel $e$, of any approved pattern, is mounted in this central portion of the water-passage in bearings $g$, one of which is supported by each hull $a$. In the mouth $h$ of the water-passage are vertical walls or guide-plates $i$ to regulate the flow of the water.

Upon the hulls $a$ may be mounted an open-ended superstructure or cabin $j$, covering the wheel $e$ and the greater portion of the water-passage. This serves as a guide or passage way for the wind to the upper part of the wheel $e$. This air-passage may be opened or closed at will by any suitable means. In this instance we show in Fig. 4 a cowl $k$ at each end. These cowls are in the form of sections of a rectangular metal pipe. Each of them is mounted upon a shaft $l$, passing through the cowl from side to side and journaled in brackets $m$, secured to the wall of the cabin or superstructure $j$. When the cowls are in the position shown at the front end of Fig. 4, the air will pass freely through them into and out of the air-passage in the cabin, but by turning the cowls on their shafts to the position shown at the rear end of Fig. 4, the parts being turned at a right angle to the open position, that part of the cowl which forms its bottom in the open position will assume an upright position and effectually close the ends of the air-passage.

The operation of the invention is as follows: The apparatus being anchored in a stream or otherwise secured against movement with the flow of the stream, the water will flow through the water-passage and engaging upon the blades of the wheel below the center or shaft will turn the wheel in one direction, and when the tide changes or the flow is reversed by any means the flow, and consequently turning of the wheel, will be in the opposite direction. It is obvious that when the blades or paddles of the wheel below the shaft are moving in one direction those above the shaft will move in the opposite direction. This opposite movement of the upper paddles is facilitated and assisted by the passage of the wind through the air-passage when the wind is blowing in an opposite direction to the flow of the water, and when the wind is blowing with the flow of the water the cowls are closed so that the air cannot pass through the air-passage.

Having thus fully described the invention, what we claim as new is—

1. An apparatus for utilizing the flow of wind and water consisting of two hulls arranged side by side with a water-passage between them, an air-passage above the water-passage, a water-wheel pivoted so that the lower blades will be in the water-passage and the upper blades in the air-passage, and means for closing the air-passage when desired all the parts being combined and arranged substantially as set forth.

2. An apparatus for obtaining power from running water comprising the hulls having diverging bows, a bottom connecting said hulls, a passage between said hulls, flaring mouths to said passage formed by the diverging bows, guides in said flaring mouths, a wheel journaled in said passage, a supplemental air-channel over said passage, and cowls to regulate and control the air passing into said channel, substantially as described.

In testimony that we claim the foregoing as our own we affix our signatures in presence of two witnesses.

ALFRED HENRY BARTON.
PERCY NUGENT OLDREY.

Witnesses to the signature of the above-named Alfred Henry Barton:
 H. STEUART,
 A. C. DORMAN.

Witnesses to the signature of the above-named Percy Nugent Oldrey:
 SAML. BROOKS,
 ARTHUR D. WALKER.